United States Patent [19]
Ball et al.

[11] Patent Number: 4,787,612
[45] Date of Patent: Nov. 29, 1988

[54] TORSIONAL VIBRATION DAMPER

[75] Inventors: Robert J. Ball; John D. Banks, both of Leamington Spa, England

[73] Assignee: Automotive Products PLC, Warwickshire, England

[21] Appl. No.: 43,810

[22] Filed: Apr. 29, 1987

[30] Foreign Application Priority Data

Apr. 30, 1986 [GB] United Kingdom ............... 8610577

[51] Int. Cl.$^4$ ..................... F16D 3/12; F16D 13/64
[52] U.S. Cl. .................... 267/273; 192/107 R; 267/283; 267/285; 464/68; 464/84
[58] Field of Search ............ 188/18 A; 267/273, 283, 267/284, 289, 285, 214, 215; 464/68, 84; 192/107 R, 106.2

[56] References Cited

U.S. PATENT DOCUMENTS

| | | | |
|---|---|---|---|
| 1,963,187 | 6/1934 | Wood | 464/84 X |
| 2,096,365 | 10/1937 | Spase | 192/107 R |
| 4,359,985 | 11/1982 | Mueller | 464/84 X |
| 4,461,376 | 7/1984 | Lech, Jr. et al. | 464/68 X |
| 4,465,172 | 8/1984 | Gatewood | 192/106.2 |
| 4,596,535 | 6/1986 | Ooga | 464/68 |
| 4,651,860 | 3/1987 | Nagano | 464/68 X |
| 4,687,086 | 8/1987 | Ward | 464/68 |

FOREIGN PATENT DOCUMENTS

| | | |
|---|---|---|
| 129978 | 2/1985 | European Pat. Off. |
| 201238 | 12/1986 | European Pat. Off. |
| 2197433 | 3/1974 | France |
| 2398927 | 3/1979 | France ............... 192/107 R |
| 1207805 | 10/1970 | United Kingdom |

Primary Examiner—Andres Kashnikow
Assistant Examiner—Matthew C. Graham
Attorney, Agent, or Firm—Solon B. Kemon

[57] ABSTRACT

A torsional vibration damper for the driven plate of a friction clutch comprises a hub, a flange extending radially out from the hub and an outer member comprising an annular side plate arranged to one side of the flange and having a central aperture such that the side plate surrounds the hub with a clearance. The side plate is capable of limited angular movement relative to the flange with circumferentially directed resilient means acting between the flange and the side plate to control the angular movement. A friction damper is provided between the hub and the side plate and comprises a resilient friction element supported in the central aperture of the side plate and bearing against the outer surface of the hub.

5 Claims, 2 Drawing Sheets

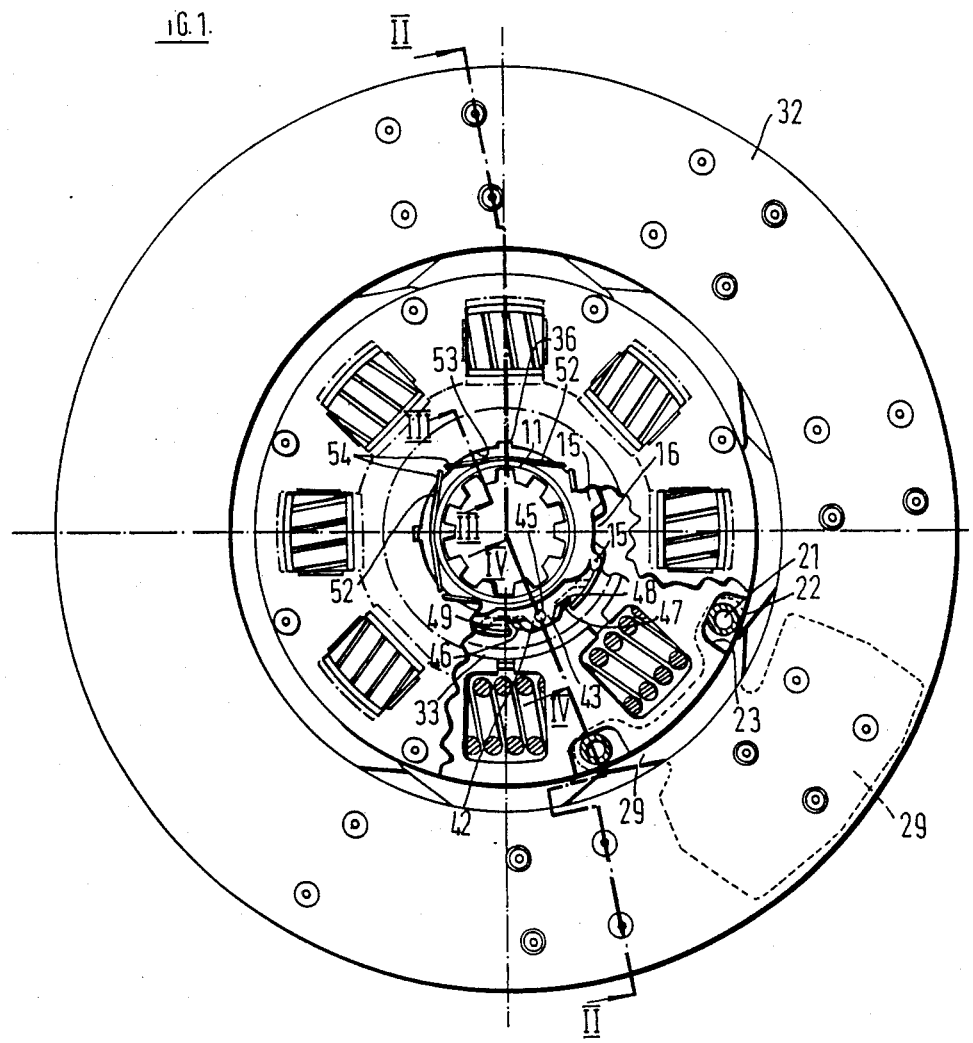

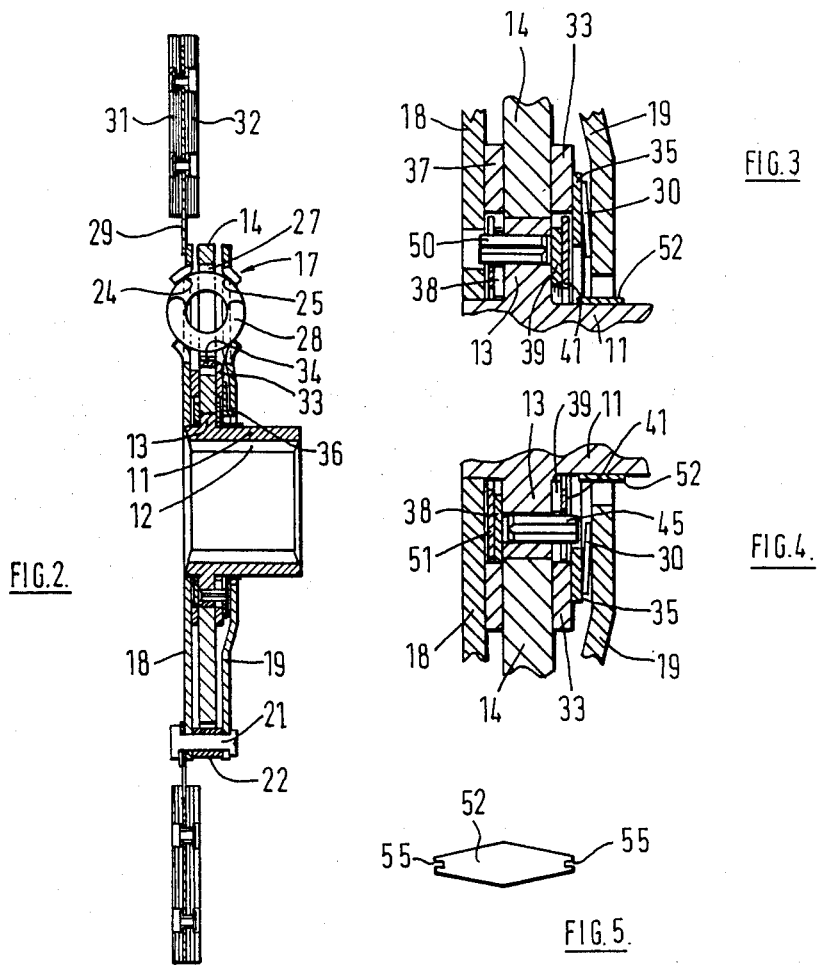

TORSIONAL VIBRATION DAMPER

FIELD OF THE INVENTION

The invention relates to torsional vibration dampers and is concerned primarily but not exclusively with such torsional vibration dampers for use in motor vehicle drive lines. Such a torsional vibration damper is normally installed in the driven plate of a friction clutch.

BACKGROUND OF THE INVENTION

There is an increasing tendency to solve various drive line vibration problems with torsional vibration dampers which take up space in a driven plate. Consequently it is desirable to provide torsional vibration dampers or parts thereof which occupy as little space as possible. One reason why space is critical is that in the interests of reducing costs, weight and size of engine-transmission combinations, it is desirable to be able to fit assemblies such as friction clutches into a small space.

OBJECT OF THE INVENTION

An object of the present invention is to provide a torsional vibration damper in which friction damping against relative angular movement between two members is provided in a simple and compact manner.

SUMMARY OF THE INVENTION

According to the present invention there is provided a torsional vibration damper comprising a hub, a flange extending radially out from the hub, an outer member comprising an annular side plate arranged to one side of the flange and having a central aperture such that the side plate surrounds the hub with a clearance, the side plate being capable of limited angular movement relative to the flange, circumferentially directed resilient means acting between the flange and the side plate to control said angular movement and friction damping means between the hub and the side plate comprising a resilient friction element supported in the central aperture of the side plate and bearing against the outer surface of the hub.

Preferably the resilient friction elements are circumferentially directed leaf springs with their outer ends supported in the aperture of the side plate and with central regions bearing against the hub. Preferably the ends of the leaf springs are supported in recesses in an otherwise circular aperture. Preferably there are four such springs, equally spaced around the hub.

The hub may be connected to the flange by a lost motion connection, angular displacement between the hub and flange being controlled by auxiliary resilient means lighter than the aforesaid resilient means and friction effective therebetween being controlled by said resilient friction element.

An embodiment of the invention will now be described by way of example only with reference to the accompanying drawings in which:

BRIEF DESCRIPTION OF THE DRAWINGS

FIG. 1 is an end elevation, with parts removed to show details, of a friction clutch driven plate according to the invention;

FIG. 2 is a section on line II—II of FIG. 1;

FIGS. 3 and 4 show parts on lines III—III and IV—IV of FIG. 1 on a larger scale in the interests of clarity; and FIG. 5 is a plan view of a resilient element employed in the driven plate of FIGS. 1 and 2.

DESCRIPTION OF PREFERRED EMBODIMENT

The friction clutch driven plate comprises a hub 11 having splines 12 for driving a gearbox input shaft. The hub has a small integral flange 13 which is effectively extended outwardly by an outer flange portion 14, constituting an intermediate drive means. Outer flange portion 14 is coupled to the hub 11 by interengaging teeth 15 and 16 which provide a lost motion connection allowing relative angular movement. A friction facing carrier 17 incorporates two side plates 18 and 19, one to each side of the flange 13 including its outer portion 14. The side plates are spaced apart from each other and joined together by rivets 21 and spacers 22. As seen in FIG. 1, the rivets and spacers lie within axially elongated openings 23 in the outer flange portion 14 in such a way as to form stop pins which limit angular deflection between the outer flange portion and the friction facing carrier. The side plates 18 and 19 are provided with mutually aligned windows 24 and 25 and the intermediate drive means 14 has corresponding windows 27. Circumferentially directed resilient means constituted by compression coil springs 28 are arranged in these windows in such a way as to provide circumferentially acting main torsion damping springing. Springs 28 control the load required to deflect the outer flange portion 14 circumferentially with respect to the friction facing carrier 17 within limits set by the stop pins in openings 23.

The friction facing carrier 17 also incorporates a ring of outwardly extending spring segments 29 carrying friction facings 31 and 32.

Friction damping means for providing controlled friction in the connection between the outer flange portion 14 and the friction facing carrier 17 are constituted by a metal friction damping ring 33 engaged by drive dogs 34 in windows 27 of the outer flange portion 14, a metal thrust washer 35 engaged by dogs 36 in the side plate 19 and a further friction damping ring 37 between outer flange portion 14 and side plate 18. Face to face pressure to establish the required friction is provided by a belville spring 30. The thickness of the outer flange portion (in an axial direction) is slightly greater than the corresponding thickness of the inner part 13 of the flange so that the friction damping does not act on this inner part.

Auxiliary circumferentially acting resilient means is also provided between the hub 11 and outer flange portion 14. This springing is constituted by two circumferentially extending open ended loop springs 38 and 39 arranged one to each side of the flange 13 adjacent the hub 11. These loop springs are cut from sheet material and each forms almost a complete circle surrounding the hub. Spring 39 and an associated spacer washer 41 are positioned in an annular space inward from the ring 33. As best seen in FIG. 1, ends 42 and 43 of the spring act as abutments and bear against a seat constituted by a pin 45 projecting from the inner flange part 13. The end portions of the spring also incorporate hook shaped abutments 46 and 47 which engage with correspondingly shaped seats 48 and 49 respectively projecting inward from ring 33 and acting as abutments.

Spring 38 is arranged in a similar way in conjunction with spacer washer 51, abutment pin 50 and abutments projecting inward from ring 37. Ring 31 is located against rotation with respect to the outer flange portion 14 by drive dogs (not shown) corresponding to the drive dogs 34.

This spring arrangement corresponds generally to that described in FIGS. 3 and 4 of our own EP-A-0129978. Briefly, spring 39 operates as follows. When the outer flange portion 14 is rotated clockwise as seen in FIG. 1 with respect to the hub 11 with its inner flange part 13, seat 48 bears against abutment 46 and allows movement by expansion of the spring, the other end 43 of which is held against abutment pin 45. The spring thus controls this relative movement until all clearance has been taken up between interengaging teeth 15 and 16. Movement in the opposite direction is controlled by the same spring loaded in the same sense by engagement of seat 49 with abutment 47 and corresponding reaction of end 42 of the spring against abutment pin 44. The spring 38 operates in a similar manner and adds to the resilient resistance to movement between the hub and the outer flange part 14.

When the driven plate as a whole comes under load, drive is transmitted from the friction facing carrier 17 to the hub 11. Initial movement takes place between the outer flange portion and the hub as described above because the springs 38 and 39 taken together are much lighter than the main springs 28. Once the movement between interengaging teeth 15 and 16 has been taken up, the springs 28 yield to provide angular movement between the friction facing carrier and the outer flange portion. This latter movement is also resisted by the friction between ring 33 and washer 35 and between ring 37 and side plate 18. However this friction is not effective for movement between the hub 11 and the outer flange portion 14.

In order to provide such friction, light friction damping is provided directly between the hub and the carrier. This friction damping is of greatest significance for angular movement between the hub and outer flange portion but is also effective during movement between the outer flange portion and the carrier.

In order to provide this friction damping, four resilient friction elements 52 are interposed between side plate 19 and hub 11. Side plate 19 has a central aperture 53 which surrounds the hub with a substantial clearance. Resilient friction elements 52 are flat leaf springs which each engage in two recesses 54 in the surface of aperture 53 by means of divided ends 55 of the leaf springs as shown in FIG. 5. The recesses 54 are so positioned that the leaf springs take up a curvature as shown and engage frictionally against the hub. Because the greatest bending moment applied to the leaf springs is near their centre, the central portion is made wider than the end portions as shown in FIG. 5.

By means of these simple resilient friction elements 52, friction damping is provided to control angular movement between the hub and carrier.

Although in this particular example the main requirement for friction damping from the friction elements 52 is light friction to control movement between the hub and the outer flange portion, a similar friction arrangement could be used in situations where the hub and the whole of its flange are united to provide friction solely for movement between the hub and carrier.

The resilient elements could of course be in other forms besides the simple leaf springs shown. For example, they could be generally V-shaped springs with the central part engaged in a recess in the carrier and their end portions engaged against the hub. In a still further alternative, a single corrugated leaf spring with corrugations slightly deeper than the clearance between hub and carrier could be inserted in the clearance between these components.

We claim:

1. A torsional vibration damper comprising:
   a hub;
   a flange extending radially out from said hub;
   an outer member comprising an annular side plate arranged to one side of said flange and having a central aperture such that the side plate surrounds the hub with a clearance, the side plate being capable of limited angular movement relative to the flange;
   circumferentially directed resilient means acting between said flange and side plate to control said angular movement; and
   friction damping means located in the clearance between said hub and side plate and comprising a plurality of resilient friction elements in the form of circumferentially directed leaf springs having outer ends supported in the aperture of said side plate and central regions bearing slidably against the outer surface of said hub.

2. A damper according to claim 1, wherein the central aperture is generally circular and wherein the side plate is formed with recesses which extend radially outwardly from said aperture, the outer ends of the leaf springs being supported in said recesses.

3. A damper according to claim 2, wherein there are four such springs, equally spaced around the hub.

4. A damper according to claim 1, wherein said hub is connected to the flange by a lost motion connection, angular displacement between the hub and flange being controlled by auxiliary resilient means lighter than the aforesaid resilient means, and friction therebetween being controlled by said resilient friction elements.

5. A friction clutch driven plate incorporating a torsional vibration damper comprising:
   a hub;
   a flange extending radially out from said hub;
   an outer member comprising an annular side plate arranged to one side of the flange and having a central aperture such that the side plate surrounds said hub with a clearance, the side plate being capable of limited angular movement relative to the flange;
   circumferentially directed resilient means acting between said flange and side plate to control said angular movement; and
   friction damping means located in the clearance between said hub and side plate and comprising a plurality of resilient friction elements in the form of circumferentially direction leaf springs having outer ends supported in the aperture of said side plate and central regions bearing slidably against the outer surface of said hub.

* * * * *